United States Patent [19]
Siddiqui et al.

[11] Patent Number: 5,935,308
[45] Date of Patent: Aug. 10, 1999

[54] LATENT IMAGE JET INKS

[75] Inventors: Mohammed W. Siddiqui, Carol Stream; Bruce A. Lent, Oak Park, both of Ill.

[73] Assignee: Videojet Systems International, Inc., Wood Dale, Ill.

[21] Appl. No.: 09/127,243

[22] Filed: Jul. 31, 1998

[51] Int. Cl.⁶ .................................................. C09D 11/00
[52] U.S. Cl. ................................. 106/31.14; 106/31.17; 106/31.2
[58] Field of Search .............................. 106/31.14, 31.17, 106/31.2

[56] References Cited

U.S. PATENT DOCUMENTS 5,395,432   3/1995   Nelson et al. ....................... 106/31.14

*Primary Examiner*—Mark L. Bell
*Assistant Examiner*—Veronica Faison
*Attorney, Agent, or Firm*—Leydig, Voit & Mayer, Ltd.

[57] ABSTRACT

A latent image printing process by applying to a substrate a latent image ink composition containing zinc bromide with an ink jet printer. Subsequently, the latent image is activated to render it visible, by application of an activator.

10 Claims, No Drawings

LATENT IMAGE JET INKS

FIELD OF THE INVENTION

The present invention relates to the field of security printing, in general, as well as to the field of ink jet printing and compositions useful therein.

BACKGROUND OF THE INVENTION

This invention relates to a printing method and system whereby the information printed on a substrate, such as paper, is transferred in the form of a latent image or "secure image" which is invisible to the eye and any other usual image detecting device at the time of printing and is revealed only after the substrate is subjected to a subsequent process of image activation.

Invisible inks have existed for many years. Many such ink systems have been found, developed and used in a limited way mainly because of the limited accessibility of such invisible inks and delivery systems for the latter.

A problem with the use of latent image printing for the purpose of product identification was that no good means existed for placing such information on a variety of substrates. Contact printing is not suitable for many such uses as there is no good means to place the image on the desired substrate if it is irregularly shaped or is substantially inaccessible to traditional contact printing devices.

Thus, latent image, variable information such as production date, lot number, batch number, serial number, and the like, could not be placed on many products, except by hand, which is cumbersome, expensive, and prone to inaccuracies, defeating the purpose of using such information.

To address such problems, U.S. Pat. No. 5,395,432 taught the use of certain ink jet compositions for use in printing latent images on a substrate. In accordance with that patent, ink jet compositions comprising zinc chloride were taught for use in making latent images. A problem associated with that formulation, however, was its corrosiveness to metal parts of the printing apparatus with which the ink comes into contact. A need therefore arose for an ink jet composition that met the goals of the composition taught in U.S. Pat. No. 5,395,432, while providing reduced corrosiveness.

Further, such an ink jet composition must meet certain rigid requirements to be useful in ink jet printing operations. These relate to viscosity, resistivity, solubility, compatibility of components and wettability of the substrate. Also, the ink must be quick-drying and smear resistant, must be capable of passing through the ink jet nozzle without clogging, and must permit rapid cleanup of the machine components with minimum effort.

SUMMARY OF THE INVENTION

In accordance with the present invention there is provided a latent ink composition for use in ink jet applications, which is capable of being applied to a white or light colored substrate to form latent printed images that are substantially invisible until activated. Such a composition comprises zinc bromide and preferably tetraethylammonium p-toluene sulfonate ("TEA p-TS"). Also, a related process for printing latent images is provided.

DETAILED DESCRIPTION OF THE PREFERRED EMBODIMENTS

The General Method

As stated, the present invention provides a latent image printing process comprising applying to a substrate a latent image ink composition, with an ink jet printer. Subsequently, the latent image is "activated" to render it visible, by applying a fluid made from an activator over the latent image. It is convenient to utilize as the activator any one or a combination of leuco dyes, such as, Copikem-1, otherwise identified as 3,3-bis(4-dimethylaminophenyl)-6-dimethyl phthalide, from Hilton Davis Co. of Cincinnati, Ohio, Copikem-4, otherwise identified as 2-anilino-3-methyl-6-diethyl aminofluoran from Hilton Davis, or PSD-150, otherwise identified as 3-cyclohexyl methyl amino-6-methyl-7-anilinofluoran from Nippon Soda Co. of Tokyo, Japan.

Ink jet printing is a non-impact technique for projecting droplets of ink onto a substrate. There are two major categories of ink jet printing, "Drop-On-Demand" ink jet and "Continuous" ink jet. Using Drop-On-Demand ink jet technology, the ink is normally stored in a reservoir and delivered to a nozzle in the print head of the printer. A means exists to force a single drop of ink out of the nozzle whenever it is needed to print a single spot on the printed medium (for example, paper). For continuous ink jet, an ink that is conductive is supplied under pressure to an ink nozzle and forced out through a small orifice, typically 35 to 120 $\mu$m in diameter. Prior to passing out of the nozzle, the pressurized ink stream proceeds through a ceramic crystal which is subjected to an electric current. This current causes a piezoelectric vibration equal to the frequency of the AC electric current. This vibration, in turn, generates the ink droplets from the unbroken ink stream. The ink stream breaks up into a continuous series of drops which are equally spaced and of equal size. Surrounding the jet, at the point where the drops separate from the liquid stream is a charge electrode. A voltage is applied between the charge electrode and the drop stream. When the drops break off from the stream each drop carries a charge proportional to the applied voltage at the instant at which it breaks off. By varying the charge electrode voltages at the same rate as drops are produced it is possible to charge every drop to a predetermined level. The drop stream continues its flight and passes between two deflector plates which are maintained at a constant potential, typically ±2.5 kV. In the presence of this field, a drop is deflected towards one of the plates by an amount proportional to the charge carried. Drops which are uncharged are undeflected and collected into a gutter to be later recycled back to the ink nozzle. Those drops which are charged, and hence deflected, impinge on a substrate traveling at a high speed at right angles to the direction of drop deflection. By varying the charge on individual drops, the desired pattern can be printed.

The ink jet process is adaptable to computer control for high speed printing of continuously variable data.

Reviews of various aspects of conventional ink jet printing can be found in these publications: Kuhn et al., *Scientific American*, April, 1979, 162–178 and Keeling, *Phys. Technol.*, 12(5), 196–303 (1981). Various ink jet apparatuses are described in U.S. Pat. No. 3,060,429, U.S. Pat. No. 3,298,030, U.S. Pat. No. 3,373,437, U.S. Pat. No. 3,416,153 and U.S. Pat. No. 3,673,601.

General Properties of the Ink

In general, the ink compositions of the present invention exhibit the following characteristics for use in ink jet printing systems: (1) a viscosity from about 1.6 to about 7.0 centipoises at 25° C.; (2) an electrical resistivity from about 50 to about 2000 ohm-cm; and (3) a sonic velocity from about 1200 to about 1300 meters/second.

All components of the ink formulation must be selected to assure that any image, when printed, remains invisible, until activated.

The Latent Image Former

The latent image former is zinc bromide, $ZnBr_2$. The amount of zinc bromide used in the latent ink formulations of the present invention can vary over a wide range. Thus, the lower limit is set only by the strength or intensity of the image that is desired, once activated. The upper limit is set by the solubility of the zinc bromide in the specific carrier, containing the other components of the formulation. Typically, the amount of zinc bromide present will vary from about 0.1 percent up to about 5 percent, with about 1 to about 5 percent being more typical and about 2 to about 3 percent being more preferred. About 2.5 percent is a contemplated preferred amount.

The Carrier

The compositions of the present invention utilize a carrier comprised of one or more organic components. The organic component may be a ketone or an alcohol, each preferably having no more than ten carbon atoms, or a mixture of both a ketone and an alcohol may be used.

Alcohols which typify those which are useful are methanol and ethanol. If ethanol is employed, it may be used in its normal commercial form, containing a denaturing agent, such as methanol, methyl isobutyl ketone or kerosene.

Useful ketones in the present invention include aliphatic ketones having no more than ten carbon atoms, in straight or branched chain arrangement, such as acetone, methyl ethyl ketone, methyl isobutyl ketone, or an alicyclic ketone such as cyclopentanone, cyclohexanone, or other alicyclic ketones having up to ten carbon atoms. The preferred organic carrier is a mixture of methyl ethyl ketone, ethanol, and water.

The carrier employed usually is in the range of about 80 percent to about 99 percent, and in the preferred practice is in the range of about 85 percent to about 95 percent. About 94 percent is the most preferred.

Usually water is not used, or if present, is present in a small quantity as it usually adversely effects the solubility, visibility of the latent image and drying time of the ink on the substrate.

The Binder

The ink jet compositions usually also contain a resin binder component. Useful resin binders include resins that are soluble in the carrier, such as ethyl cellulose, to improve adhesion between the printed image and the substrate on which the printing is effected. Other cellulosic resins may be employed so long as they are soluble in the carrier.

Also, other types of resins include polyamide resins; polyester resins; acrylics, polymers and copolymers; silicone polymers and copolymers; polyketone resins; hydrocarbon resins; acrylic ester resins; vinyl ester type resins; vinyl caloride polymer and copolymer resins; and hydrocarbon resins.

A variety of such resin binders may be employed, as described in U.S. Pat. Nos. 4,210,566, 4,260,531, 4,567,213 and 4,070,322, all of which are incorporated by reference.

There is no need for a binder to always be present, especially if adhesion to the substrate is not a problem or when printing on porous substrates. When desired, the binder can be present in an amount from about 0.1 to about 5 percent, with from about 0.5 to about 2 percent being more preferred, and an amount from about 1 percent being most preferred.

Optional Components

In addition, other optional additives may be present. Such additives may be any substance that can alter the ink to result in (i) improved solubility of components, (ii) improved print quality, (iii) improved adhesion of the ink to the media, and (iv) improved control of wetting characteristics, which may be related to properties as surface tension and viscosity, among properties.

Conductivity Agents

The compositions of the present invention usually contain a conductivity agent, such as TEA p-TS, and usually in an amount of from about 0.5 percent to about 1.5 percent, more typically from about 1 to about 5 percent, with about 2 percent being most preferred. Other conductivity agents may be employed, but TEA p-TS provides conductivity with a small amount of corrosiveness, as compared to other conductivity agents.

Surfactants

Surfactants may also be used in the ink compositions of the present invention to modify the surface tension of the compositions. If present, they may be present in the ink composition in amounts of from about 0.01 percent to about 0.2 percent, more typically from about 0.1 to about 1 percent, with about 0.5 percent being most preferred. The preferred surfactant is a non-ionic surfactant such as fluorinated alkyl esters like FC-170 or FC-430, surfactants from 3M. The surfactant may not be needed at all, especially if nonporous surfaces are the intended substrate.

Corrosion Inhibitors

Suitable corrosion inhibitors may be present, and if present, may be present in an amount from about 0.1 percent to about 5 percent. Suitable corrosion inhibitors include alkyl amines as well as other recognized corrosion inhibitors. Typical examples of alkylamines are dipropyl amine, diethylamine and dibutyl amine. Again, care must be taken not to use a corrosion inhibitor that might react with the image former, zinc bromide, to form an insoluble precipitate.

Plasticizers

In some instances it may be useful for the ink jet composition to also contain a plasticizer. Plasticizers such as pentaerythritol tetrabenzoate, commercially available as Benzoflex S552 (Velsicol Chemical Corporation, Chicago, Ill.), trimethyl citrate, commercially available as Citroflex 1 (Monflex Chemical Company, Greensboro, N.C.), N,N-dimethyl oleamide, commercially available as Halcomid M-18-OL (C. P. Hall Company, Chicago, Ill.), and the like, may be present.

Other Optional Components

The viscosity of the jet ink composition is generally from about 1 to about 10 centipoise, and preferably from about 2 to about 5 centipoise. Various, known viscosity modifying agents may be added, as needed to adjust the viscosity of any given ink formulation.

Application

The compositions of this invention can be applied to a wide range of porous and non-porous substrates, such as paper, corrugated cardboard and other porous graphic paper products and on non-porous substrates, e.g. coated paper, metal, wood, metals, ceramics, plastics or glass.

After application, the images can be activated to render them visible by use of any of the activators discussed above. The activators can be applied by any suitable means, such as spraying, coating, dipping or the like.

The following examples further illustrate the ink compositions of the present invention, but of course, should not be construed as in any way limiting its scope.

EXAMPLE I

The following composition was formulated:

|  | % |
| --- | --- |
| CDA 19 200 proof (Ashland Chemicals) | 94.10 |
| Ethocel ® standard 4 premium ethyl cellulose (Dow Chemical) (resin binder) | 0.90 |
| FC-170(c) (3M Co.) (surfactant) | 0.50 |
| Zinc bromide (Aldrich Chemicals) | 2.50 |
| Tetraethylammonium p-toluene sulfonate (Aldrich Chemicals) (conductivity agent) | 2.00 |
|  | 100.00 |

When the above ink is printed on porous paper packaging with an ink jet printer, it dries quickly, it appears nearly invisible on the substrate. It can only be visualized by the application of a chemical (such as contained in a marking pen) over the printed message. This will render the message visible upon application of the activator material.

The ink of Example 1 comprising zinc bromide and the preferred conductivity agent, TEA p-TS and ink made in accordance with U.S. Pat. No. 5,395,432, containing zinc chloride and another conductivity agent, were used in a corrosion comparison test. An ink jet print head was immersed ink the ink of the present invention and another ink jet print head was immersed in the ink made in accordance with the '432 patent. Each print head was immersed in the ink for eight hours and then air dried for sixteen hours. The print head that was immersed in the ink of the '432 patent shows corrosion spots on brass and steel (welded and cut parts), whereas the print head that was immersed in the ink of the present invention did not show any corrosion spots after six days. On the seventh day a few light-colored spots were present on the steel (welded and cut parts).

EXAMPLE II

Additionally, to demonstrate that the zinc bromide of the present invention provides reduced corrosion in comparison to an ink formulation comprising zinc chloride, even if the preferred conductivity agent, TEA p-TS, is not used, the following experiment was conducted.

Ink made in accordance with the present invention was formulated containing zinc bromide and as the conductivity agent, hydroxylamine hydrochloride. Ink made in accordance with the '432 patent was also formulated, containing zinc chloride and as the conductivity agent, hydroxylamine hydrochloride.

An ink jet print head was immersed ink the ink of the present invention and another ink jet print head was immersed in the ink made in accordance with the '432 patent. Each print head was immersed in the ink for eight hours and then air dried for sixteen hours. The print head that was immersed in the ink of the '432 patent shows corrosion spots on brass and steel (welded and cut parts), whereas the print head that was immersed in the ink of the present invention did not show any corrosion spots after two days. On the third day a few light-colored spots were present on the steel (welded and cut parts).

The foregoing demonstrated that zinc bromide used in accordance with the present invention provide ink jet ink formulations that are less corrosive than those of the prior art using zinc chloride and that the use of the preferred conductivity agent, TEA p-TS, in combination with the zinc bromide provided an ink composition with the lowest amount of corrosiveness.

All of the references cited herein are hereby incorporated in their entireties by reference. All references herein to percentages are intended to be percentages, by weight, unless otherwise specified.

While this invention has been described with an emphasis upon certain preferred embodiments, it will be obvious to those of ordinary skill in the art that variations in the preferred composition and method may be used and that it is intended that the invention may be practiced otherwise than as specifically described herein. Accordingly, this invention includes all modifications encompassed within the spirit and scope of the invention as defined by the following claims.

What is claimed is:

1. A latent image ink composition for use in ink jet printing comprising:

a. zinc bromide; and b. a carrier;

said composition having (1) a viscosity from about 1.6 to about 7.0 centipoises at 25° C.; (2) an electrical resistivity from about 50 to about 2000 ohm-cm; and (3) a sonic velocity from about 1200 to about 1300 meters/second; and said composition being substantially invisible when printed upon a white or light colored substrate.

2. The composition of claim 1 further comprising tetraethylammonium p-toluene sulfonate as a conductivity agent.

3. The composition according to claim 1, further comprising a surfactant capable of modifying the surface tension of said ink composition.

4. The composition according to claim 3, wherein said surfactant is a fluorinated alkyl ester.

5. The composition according to claim 1, wherein the carrier is ethanol or denatured ethanol.

6. A method of printing a latent image on a substrate, comprising ink jet printing onto said substrate a latent image ink composition, said composition comprising:

a. zinc bromide; and b. a carrier;

said composition having (1) a viscosity from about 1.6 to about 7.0 centipoises at 25° C.; (2) an electrical resistivity from about 50 to about 2000 ohm-cm; and (3) a sonic velocity from about 1200 to about 1300 meters/second; and said composition being substantially invisible when printed upon a white or light colored substrate.

7. The method of claim 6 further comprising tetraethylammonium p-toluene sulfonate.

8. The method according to claim 6, further comprising a surfactant capable of modifying the surface tension of said ink composition.

9. The method according to claim 8, wherein said surfactant is a fluorinated alkyl ester.

10. The method according to claim 9 wherein the carrier is ethanol or denatured ethanol.

* * * * *